United States Patent

[11] 3,617,547

| [72] | Inventors | Albert H. Halff |
| | | 3574 Rock Creek Drive, Dallas, Tex. 75204; |
| | | Allen F. Reid, 258 Mill Spring Road, Manhasset, N.Y. 11030 |
| [21] | Appl. No. | 714,179 |
| [22] | Filed | Mar. 19, 1968 |
| [45] | Patented | Nov. 2, 1971 |

[54] PROCESS FOR OSMOTICALLY DECREASING THE CONCENTRATION OF A SOLUTE
16 Claims, 4 Drawing Figs.

| [52] | U.S. Cl. | 210/22, 210/23, 210/321 |
| [51] | Int. Cl. | B01d 13/00 |
| [50] | Field of Search | 210/22, 23, 321 |

[56] References Cited
UNITED STATES PATENTS

| 3,097,076 | 7/1963 | Reid | 210/22 X |
| 3,357,917 | 12/1967 | Humphreys | 210/22 |
| 3,386,912 | 6/1968 | Lazare | 210/22 |
| 3,532,621 | 10/1970 | Hough | 210/22 |
| 3,130,156 | 4/1964 | Neff | 210/152 |

*Primary Examiner*—Frank A. Spear, Jr.
*Attorney*—George C. Bower

ABSTRACT: The process comprises the transfer of a common solvent through a permeable membrane from a donor solution with a difficult to separate solute to a recipient solution having an osmolality provided by a solute which is readily separated from the common solvent. The solubility of the solute of the recipient solution is a high solubility below the vaporization temperature of the common solvent and a low solubility above the solidifying temperature of the common solvent.

PATENTED NOV 2 1971　　　3,617,547

INVENTORS
ALBERT H. HALFF
ALLEN F. REID

BY George E. Bower
ATTORNEY

INVENTORS
ALBERT H. HALFF
ALLEN F. REID
BY George C. Bower
ATTORNEY

3,617,547

PROCESS FOR OSMOTICALLY DECREASING THE CONCENTRATION OF A SOLUTE

BACKGROUND OF INVENTION

The process is particularly applicable to the desalting of sea water or other salt-bearing water. In present desalting processes pure water is produced by distillation, chemical ion exchange, electrodialysis and other processes. Osmotic processes are also used in which the solutions are placed under external pressure.

SUMMARY OF THE INVENTION

In this process a solvent in a solution having a solute difficult to separate from the solvent is extracted by passing the solvent through a permeable membrane to a solution comprising the solvent and a solute easily separated from the solvent. The solute of the recipient solution is easily separated from the solvent by precipitation leaving a substantially purer solvent product.

An object of the invention is to extract by osmotic process a solvent from a solution having a solute difficult to separate from the solvent.

Another object of the invention is to extract by osmotic process the solvent from a solution having a solute difficult to separate from the solvent with a low expenditure of energy and under a reasonable expense.

Other objects and advantages will be apparent from the drawings.

DETAILED DESCRIPTION

Figure 1:
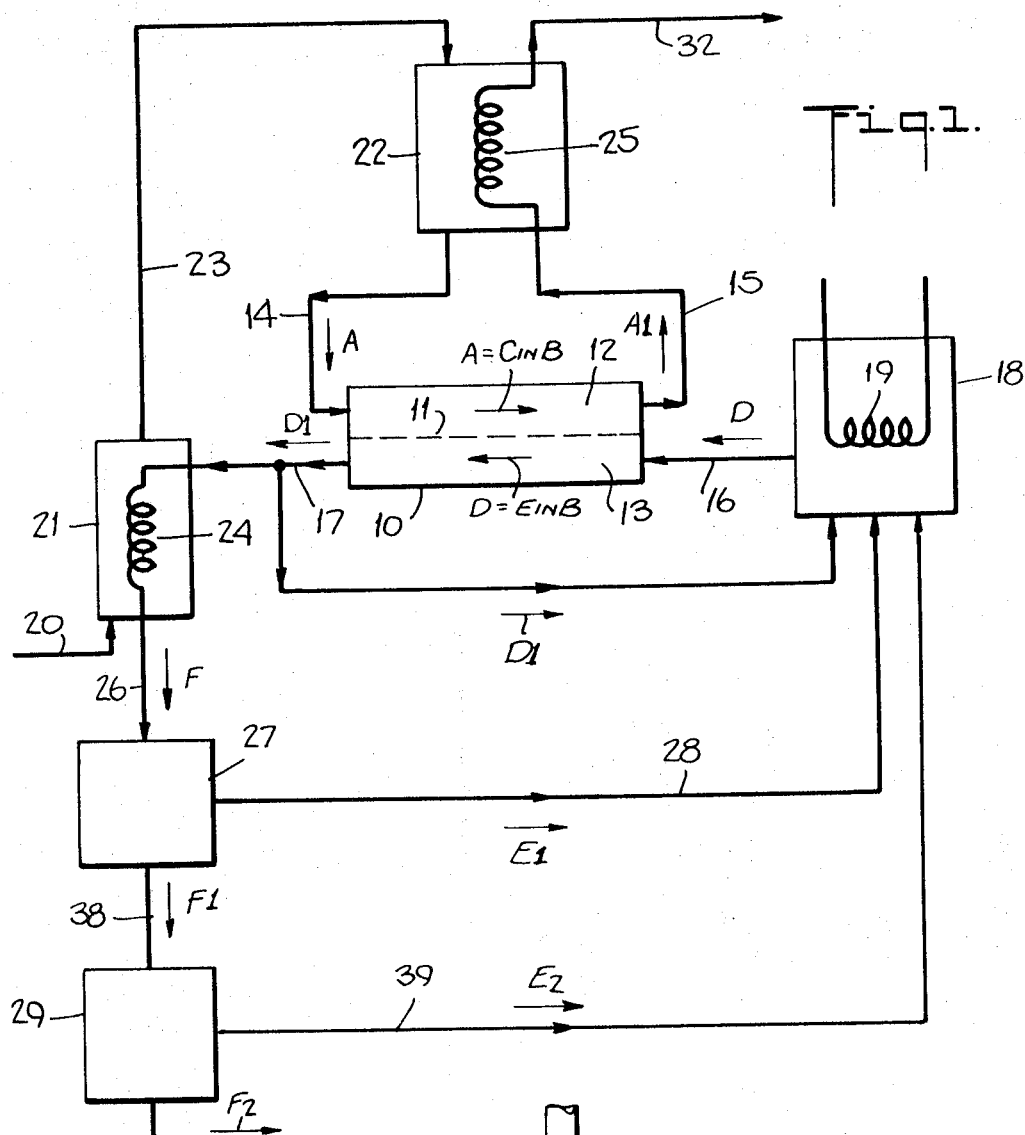
FIG. 1 schematically illustrates the apparatus performing the process with one osmotic agent.

Referring to the drawings, a cell 10 has a membrane 11 dividing the cell into compartments 12 and 13. A solution A of a solvent B and a solute C is supplied by conduit 14 to compartment 12. A portion of solvent B is transferred from compartment 12 to compartment 13 through the membrane 11. This increases the concentration of solute C in the solution A to form a concentrated solution A1 of solute C in solvent B. This solution A1 is discharged into conduit 15.

The conduit 16 delivers a solution D of solvent B with solute E to the compartment 13. The solution D flows counter to the flow of solution A in compartment 12. The solution D is diluted by solvent B received from compartment 12 to form a solution D1 of the solvent B with solute E. The solution is discharged to the conduit 17.

The solute E varies considerably in solubility with change in temperature. It is soluble at elevated temperatures and substantially less soluble at lower temperatures so that it precipitates and separates from solution D1 to form the solution F. The solute E is effective to impart a high osmolality at a high temperature and at a low temperature to separate from the solution F. The solute E is effective to impart a high osmolality at a high temperature and at a low temperature to separate from the solution. The membrane is permeable to the solvent B and impermeable to the solutes C and E. The concentration of the solute E in solutions D and D1 is higher at every point of the membrane than the concentration of the solute C in solution A. The solvent B passes through membrane 11 reducing the ratio of solute E to solvent B in solution D to form the solution D1.

The hot solution D1 is passed by conduit 17 to the coils 24 of the heat exchanger 21. The incoming solution A is introduced by feedpipe 20 and discharged into pipe 23 connected to the heat exchanger 22. The incoming solution A is at a temperature sufficiently low to cool the solution D1 to a temperature at which the solute E in solution D1 precipitates to form solution F.

The solution F with the precipitated solute E is transferred to the filter 27 where the precipitated solute E is separated from the solution F. The separated precipitate E1 is delivered by conduit 28 to the reservoir 18. The cool filtered solution F1 of solvent B and solute E has a lower osmolality than the solution A. The filtrated solution F1 is further purified of any remaining solute E in cell 29 by reverse osmosis, ion exchange or electrodialysis depending on the ionic character of the solute E. The purified solution F2 is discharged to pipe 31 as the product of the process. The remaining separated solute E2 may be fed to the reservoir 18.

The reservoir 18 forms and prepares the solution D which is fed to the compartment 13 of cell 10. A portion of the solution D1 discharged from the compartment 13 is fed back to the reservoir 18. This is mixed with the precipitated solute E1 from the filter 27 and the separated solute E2 from cell 29. Heat is provided to the reservoir by steam passing through coil 19 in the reservoir. This raises the temperature so that the precipitated and separated solutes E1 and E2 dissolve in the solvent B to form the solution D. The solution D is delivered to compartment 13 by conduit 16.

The solution A1 higher in concentration in solute C than solution A is discharged to conduit 15 from the compartment 12 and passed through coil 25 to heat the incoming solution A and cool the solution A1. The solution A1 is discharged through pipe 32 as waste.

Figure 2:
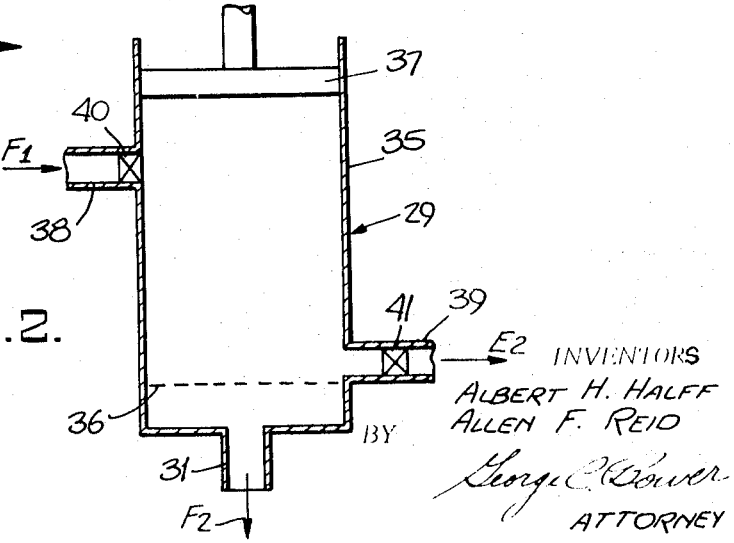
FIG. 2 schematically illustrates the separation of the remaining solute of the recipient solution by osmotic means.

As to cell 29 various conventional processes and apparatuses may be used to remove any residual solute E in the purified solvent. As illustrated in FIG. 2 the cell 29 may comprise a cylinder 35 with a reinforced membrane 36 and a piston 37. The filtrated solution F1 is introduced at the upper end by the conduit 38, the piston forces the solution F1 against the membrane 36 and only the solvent B passes through the membrane 36 into the lower part of the cylinder 35 and is discharged to the pipe 31 as the purified solution F2. The remaining separated solute E2 is transferred to the reservoir 18 by the pipe 39 for reuse in the process. The conduits 38 and 39 have valves 40 and 41, respectively, for checking and permitting the flow of solution in the proper direction.

Figure 3:
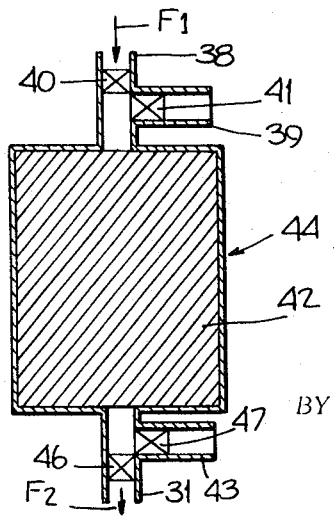
FIG. 3 schematically illustrates the separation of the remaining solute of the recipient solution by ionic means.

FIG. 3 illustrates a cell 44 for separating the remaining solute E of the solution F1 by ion exchange. The solute C is sodium chloride and the solute E is sodium borate. The cell 44 is filled with an anion exchange resin 42 charged with chloride. The solution F1 with the remaining solute E of sodium borate is introduced through pipe 38 with the valve 40. The solution F1 progresses through the resin bed 42 and exchanges the borate for the chloride. The resin is then charged with the borate. The solution discharged through the pipe 31 with the valve 46 comprises solvent B and a small concentration of sodium chloride as the purer solution. The resin 42 is charged with borate. To remove the borate and recharge the resin with chloride valve 46 is closed and valve 47 in pipe 43 is opened. A concentrated sodium chloride solution is then passed into pipe 43 through resin bed 42 and outlet pipe 39 with the valve 41 open. The valve 40 in the pipe 38 is closed. As the concentrated sodium chloride passes through the cell the chloride is exchanged for the borate. At the top of the cell the solution comprises a solvent B with the sodium borate and is discharged to the reservoir 18 through the pipe 39 for reuse in the process.

Considering the process in connection with the purification of sea water, 3.5 percent sea water is provided by the pipe 20 to the heat exchanger 21 at a rate of 1,550 gallons per day. This input water may be in the order of 10° C. and solution D1 in the pipe 17 is at about a temperature of 55° C. The coil 24 is at a temperature of about 55° C. where the solution D1 enters the heat exchanger and raises the temperature of the sea water. This sea water is about 3.5 percent salinity. The sea water is then fed to the heat exchanger 22 which at the entrance of the sea water has a temperature of about 51° C. and at the exit of the sea water a temperature of about 60° C. This heated sea water is then fed to the cell 10. The solution D is fed from the reservoir 18 which is provided with a coil passing steam therethrough. The solution D has a temperature of about 65° C. and is supplied at a rate of 860 gallons per day. The solution A receives heat from the solution D so that solution A1 has a temperature between 60° and 65° C. The solution F discharged from the heat exchanger 21 is at approximately 13° C. The finally purified solution F1 is discharged at pipe 31 at a rate of about 1,000 gallons per day.

The reservoir 18 forms the solution D with about 16.6 percent sodium tetraborate and this is supplied at the rate of 860 gallons per day to the compartment 13 of the cell 10. The sodium tetraborate at a temperature of 65° C. has a solubility of 22 grams in 100 grams of water, and at 10° C. is one gram per 1,000 grams of water. Comparing the sodium tetraborate of solution D with the sodium chloride of solution A, one osmole of sodium tetraborate is 67.1 grams and one osmole of sodium chloride is 29.2 grams. Thus the 16.6 percent sodium tetraborate solution D is higher in osmolality than the 3.5 percent solution A of sea water. The solution A due to the loss of the water solvent B increases to 7.4 percent and the sodium borate solution D1 is 9.2 percent of sodium borate. Thus the solution D always has a higher osmolality than the solution A and the solvent B will pass through the membrane 11 into the compartment 13 from the compartment 12. If the solution A and solution D have a common ion, then the membrane may be also permeable to this common ion as well as the common solvent B.

Many inorganic or organic compounds may be used as the solute E in extracting water from sea water. Other types of solution A may be purified. A chart is set forth listing some inorganic and organic compounds that may be used as solute E showing the change in solubility with change in temperature and the molecular weight and osmolal weight and the number of particles formed on dissolution of the compounds in the common solvent, such as water.

Figure 4:
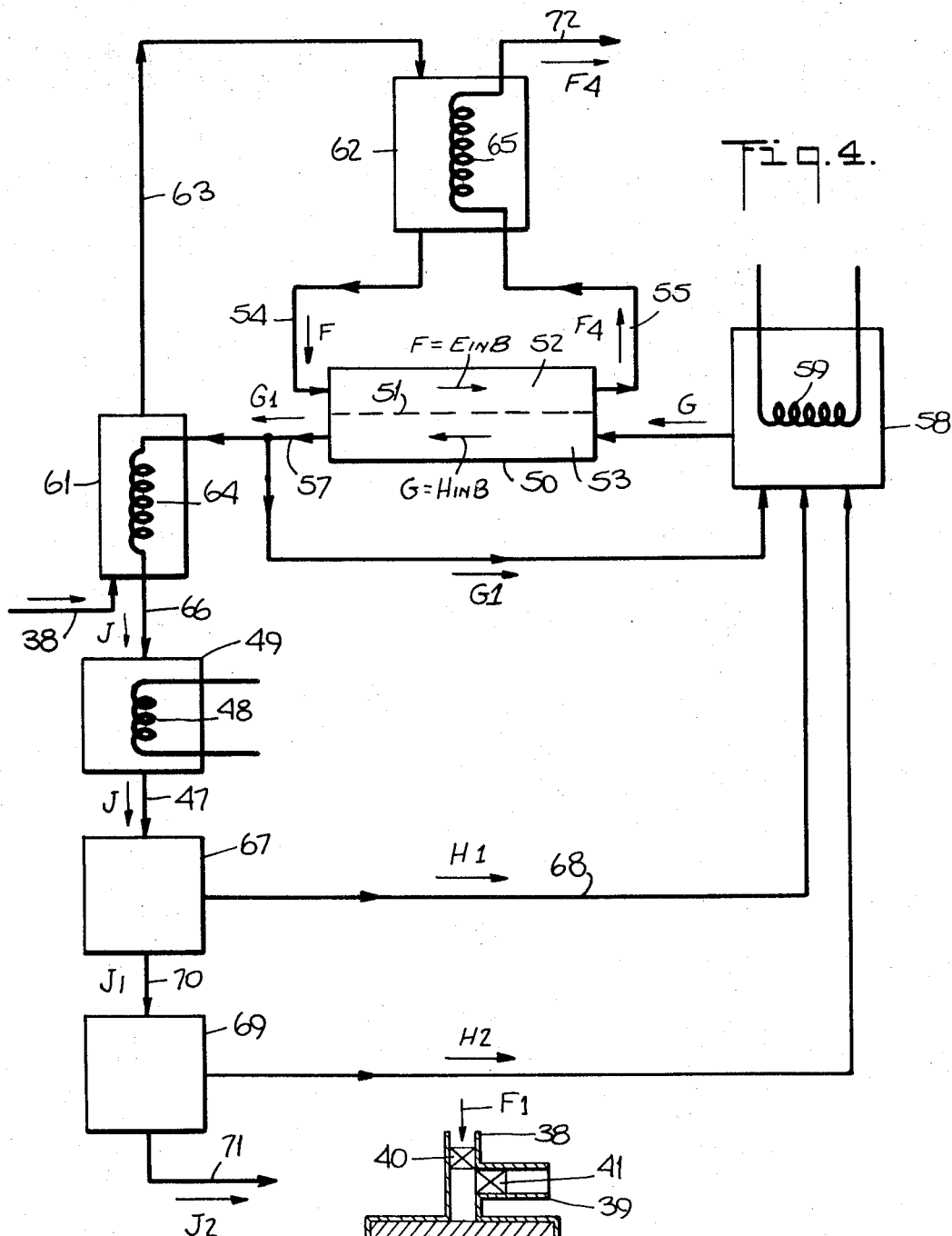
FIG. 4 schematically illustrates the apparatus using two osmotic agents to produce a purer solvent.

An example is the use of sodium borate as the first osmotic agent E, schematically illustrated in FIG. 1, followed by cesium aluminum sulfate as the second osmotic agent H, schematically illustrated in FIG. 4. In the second stage system, a cell 50 has a membrane 51 dividing the cell into compartments 52 and 53. Solution F of solvent B and solute E is supplied by conduit 54 to compartment 52. A portion of solvent B is transferred from compartment 52 to compartment 53 through the membrane 51. This increases the concentration of solute E in the solution F to form a concentrated solution F4 of solute E in solvent B. This solution F4 is discharged into conduit 55.

The conduit 56 delivers a solution G of solvent B with solute H to the compartment 53. The solution G flows counter to the flow of solution F in compartment 52. The solution G is diluted by solvent B received from compartment 52 to form a solution G1 of the solvent B with solute H. The solution is discharged to the conduit 57.

The solute H varies considerably in solubility with change in temperature. It is soluble at elevated temperatures and substantially less soluble at lower temperatures so that it precipitates and separates from solution G1 to form the solution J when cooled in heat exchanger 61 and further cooled in refrigeration chamber 49. The solute H is effective to impart a high osmolality at a high temperature and at a low temperature to separate from the solution. The membrane is permeable to the solvent B and impermeable to the solutes E and H. The concentration of the solute H in solutions G and G1 is higher at every point of the membrane than the concentration of the solute E in solution F. The solvent B passes through membrane 51 reducing the ratio of solute H to solvent B in solution G to form the solution G1.

The hot solution G1 is passed by conduit 57 to the coils 64 of the heat exchanger 61. The incoming solution F is introduced by feed pipe 38 and discharged into pipe 63 connected to the heat exchanger 62. The incoming solution F cools the solution G1 and the refrigeration chamber 49 cools the solution G1 further to a temperature at which the solute H

SOLUBILITY CHART

| Compounds | ANP | MW | OMW | Solubility—grams per 100 grams $H_2O$ | | | |
|---|---|---|---|---|---|---|---|
| | | | | Weight | ° C. | Weight | ° C. |
| Barium hydroxide | 3 | 315 | 105 | 5.6 | 15 | 94.7 | 78 |
| Calcium salicylate | 3 | 368 | 123 | 2.7 | 15 | 44.7 | 100 |
| Cesium aluminum sulfate | 4 | 568 | 142 | 0.34 | 0 | 42.5 | 100 |
| Potassium iodate | 2 | 214 | 107 | 4.74 | 0 | 32.3 | 100 |
| Potassium permanganate | 2 | 158 | 129 | 2.83 | 0 | 25 | 65 |
| Trisodium phosphate | 4 | 380 | 95 | 1.5 | 0 | 157 | 70 |
| Sodium sulfate | 3 | 142 | 47 | 4.76 | 0 | 42.7 | 100 |
| Strontium hydroxide | 3 | 122 | 41 | 0.41 | 0 | 21.8 | 100 |
| Strontium oxalate | 2 | 194 | 97 | 0.0051 | 18 | 5 | 100 |
| Sodium tetraborate | 3 | 201 | 67 | 1.0 | 10 | 52.3 | 100 |
| Dodecylamine hydrochloride | 2 | 222 | 111 | 0.4 | 25 | 103 | 100 |

NOTE:
ANP = Approximate number of particles.
MW = Molecular weight.
OMW = Osmolal weight.

Of the organic compounds a dodecylamine hydrochloride is preferred as the solute E in view of its wide solubility and the low solubility at the lower temperature. The aforementioned compounds have a low solubility and a range of solubility within acceptable temperature ranges which do not require extremes of heating or cooling to attain. This list is only illustrative and there are many other compounds, both organic and inorganic which are acceptable.

The invention may be utilized in other embodiments. The solute E may be considered an osmotic agent and in certain applications two osmotic agents may be desirable to produce a purified product. The first agent may be used to withdraw the water from the solution A and the second agent could be used to remove the water from the solution with the first agent. This may be required where the first osmotic agent does not have a sufficient change in solubility with change in temperature to create a purified common solvent.

in solution G1 precipitates to form solution J. The solution J with the precipitated solute H is transferred to the filter 67 where the precipitated solute H is separated from the solution J. The precipitate H1 is delivered by conduit 68 to the reservoir 58. The cool filtered solution J1 of solvent B and solute H has a lower osmolality than the solution F. The filtered solution J1 is further purified of any remaining solute H in cell 69 by reverse osmosis, ion exchange, or electrodialysis depending on the ionic character of the solute H. The purified solution J2 is discharged to pipe 71 as the product of the process. The remaining separated solute H2 may be fed to the reservoir 58.

The reservoir 58 forms and prepares the solution G which is fed to the compartment 53 of cell 50. A portion of the solution G1 discharged from the compartment 53 is fed back to the reservoir 58. This is mixed with the precipitated solute H1 from the filter 67 and the separated solute H2 from cell 69. Heat is provided to the reservoir by steam passing through coil 59 in the reservoir, This raises the temperature so that the solute H dissolves in the solvent B to form the solution G. The solution G is delivered to compartment 53 by conduit 56.

The solution F4 higher in concentration in solute E than solution F is discharged to conduit 55 from the compartment 52 and passed through coil 65 to heat the incoming solution F and cool the solution F4. The solution F4 is discharged through pipe 72 into reservoir 18 to be used in the makeup of solution D in stage one of the process.

In connection with the purification of sea water, the first stage is operated as described above with the solution F, about 1.71 percent sodium borate in water, being discharged from filter 27 at approximately 13° C. into the second stage system through conduit 38 at a rate of about 1,000 gallons per day. Solution G1 in the line 57 is at a temperature of about 51° C. The coil 64 is at a temperature of about 51° C. where the solution enters the heat exchanger 61 and raises the temperature of the sodium borate solution. This sodium borate solution is then fed to the heat exchanger 62 which is about 46° C. where the sodium borate solution enters and about 60° C. where it leaves and which will raise the temperature of the sodium borate solution to about 51°C. This heated solution is then fed to the cell 50. The solution G is fed from the reservoir 58 which is provided with a coil 59 passing steam therethrough. The solution G has a temperature of about 95° C. and is supplied at a rate of about 140 gallons per day. The solution J discharged from the heat exchanger 61 is at approximately 15° C. It is further cooled in chamber 48 to approximately 3° C. The finally purified solution J2 is discharged at pipe 71 at a rate of about 875 gallons per day.

The reservoir 58 forms the solution G with about 26 percent cesium aluminum sulfate and this is supplied at the rate of about 140 gallons per day to the compartment 53 of the cell 50. The cesium aluminum sulfate has s solubility of 42.5 grams in 100 grams of water at 100° C. and 0.34 grams in 100 grams of water at 0° C. Comparing the cesium aluminum sulfate of solution G with the sodium tetraborate of solution F, one osmole of cesium aluminum sulfate is 97 grams and one osmole of sodium tetraborate is 67.1 grams. Thus the 26 percent aluminum sulfate solution G is higher in osmolality than the 1.71 percent sodium tetraborate solution F. The solution F due to the loss of water solvent B increases to 12.2 percent sodium tetraborate and the cesium aluminum sulfate solution G1 is 4.1 percent of cesium aluminum sulfate. Thus the solution G always has a higher osmolality than the solution J and the solvent B will pass through the membrane 51 into the compartment 53 from the compartment 52.

Also, instead of removing the osmotic agent by precipitation, osmotic agents may be used that can be oxidized or reduced to a less soluble form and then removed by filtering and reconverted to the osmotic agent for reuse. For example, cupric chloride has a high solubility, about 80 grams per 100 grams of water at room temperature. When it is reduced electrically or by some chemical reducing agent it forms cuprous chloride, with a solubility of only 0.0062 grams per 100 grams of water at room temperature. The cuprous chloride precipitate may be reconverted to cupric chloride for reuse by oxidation electrically or by some chemical oxidation means, such as bubbling oxygen through a suspension of the cuprous chloride. Another example is ferrous acetate, which is very soluble in water at room temperatures. When it is oxidized electrically or by bubbling oxygen through its solution, it forms ferric basic acetate, which is insoluble. The ferric basic acetate precipitate may be reconverted to ferrous acetate for reuse by reduction electrically or by some chemical reduction means, such as bubbling hydrogen through a suspension of ferric basic acetate.

It is of course, understood that the membrane 11 may be permeable to a common ion of solutes C and E. The membrane in this instance is impermeable to the ions of the solutes C and E which are different.

The advantage of the process is that the solvent B may be extracted and separated from the undesirable solute C of the solution A without entering into the energy range of the heat of vaporization or solidification of the solvent B. The energy requirements are kept low and the heats of the solutions are readily transferable by heat exchange apparatus and methods so that only sufficient heat needs to be added to maintain the process at the desired temperatures. Thus the desired solvent may be extracted without heat losses or the expenditure or transfer of large amounts of energy.

Various modifications and changes may be made in the process without departing from the invention as set forth in the appended claims.

We claim:

1. A process for providing a purer solution from a first solution having a solvent and a solute comprising providing a second solution of greater osmolality than said first solution formed of the solvent with a second solute dissociating into at least two particles on dissolution and being highly soluble at given temperatures in said solvent and substantially less soluble at lower temperatures, passing said first and second solutions at a temperature of high solubility of the second solute in the solvent on opposite sides of a membrane permeable to the solvent; passing the solvent from said first solution through said membrane to said second solution to form a third solution; reducing the temperature of said third solution to precipitate said second solute; separating said precipitated second solute; and replacing the remaining second solute with said first solute to form a purer solution of the solvent with said first solute.

2. A process for providing a purer solution from a first solution having a solvent and a solute comprising providing a second solution of greater osmolality than said first solution with a second solute of high solubility and convertible into an insoluble solute on change of valence, passing said first and second solutions on opposite sides of a membrane permeable to the solvent, passing the solvent from said first solution through the membrane to said second solution to form a third solution, converting the second solute by change of valence to an insoluble third solute to precipitate said third solute and separating said precipitated third solute to provide a purer solution.

3. A process as set forth in claim 2 wherein the separated precipitated third solute is changed in valence to reform the second soluble solute, separating a portion of said third solution and dissolving said reformed second solute therein to form the second solution.

4. A process as set forth in claim 2 wherein said second solute is reduced to form the insoluble third solute.

5. A process as set forth in claim 4 wherein said second solute is cupric chloride and said third solute is cuprous chloride.

6. A process as set forth in claim 2 wherein said second solute is oxidized to form the insoluble third solute.

7. A process as set forth in claim 6 wherein said second solute is ferrous acetate and said third solute is ferric basic acetate.

8. A process for providing a purer solution from a first solution having a solvent and solute comprising providing a second solution of greater osmolality than said first solution formed of the solvent with a second solute highly soluble at given temperature in said solvent and substantially less soluble at a lower temperature, passing said first and second solutions at a temperature of high solubility of the second solute in the solvent on opposite sides of a membrane permeable to the solvent, passing the solvent from said first solution through the membrane to said second solution to form a third solution, reducing the temperature of said third solution to precipitate said second solute and separating said precipitated second solute to provide a purer third solution, further purifying the third solution by forcing said solvent through a membrane while retaining said second solute.

9. A process for providing a purer solution from a first solution having a solvent and solute comprising providing a second solution of greater osmolality than said first solution formed of the solvent with a second solute highly soluble at given temperature in said solvent and substantially less soluble at a lower temperature, passing said first and second solutions at a temperature of high solubility of the second solute in the solvent, on opposite sides of a membrane permeable to the solvent, passing the solvent from said first solution through the membrane to said second solution to form a third solution, reducing the temperature of said third solution to precipitate said second solute and separating the said precipitated second solute as a solid to provide a purer third solution, replacing the remaining second solute with said first solute by passing said separated third purer solution through an ion exchange medium with said second solute to form a purer third solvent with said first solute.

10. A process for providing a purer solution from a first solution having a solvent and solute comprising providing a second solution of greater osmolality than said first solution formed of the solvent with a second solute highly soluble at a given temperature in said solvent and substantially less soluble at a lower temperature, passing said first and second solutions at a temperature of high solubility of the second solute in the solvent on opposite sides of a membrane permeable to the solvent, passing the solvent from said first solution through the membrane to said second solution to form a third solution, reducing the temperature of said third solution to precipitate said second solute and separating said precipitated second solute to provide a purer third solution, and said second solute is further separated from said purer third solution by electrodialysis to form a still purer third solvent.

11. A process for providing a purer solution from a first solution having a solvent and solute comprising providing a second solution of greater osmolality than said first solution formed of the solvent with a second solute highly soluble at a given temperature in said solvent and substantially less soluble at a lower temperature, passing said first and second solutions at a temperature of high solubility of the second solute in the solvent on opposite sides of a membrane permeable to the solvent, passing the solvent from said first solution through the membrane to said second solution to form a third solution, reducing the temperature of said third solution to precipitate said second solute and separating said precipitated second solute to provide a purer third solution, forming a fourth solution of the solvent with a third solute and of greater osmolality than said third solution, said third solute being highly soluble at a given temperature in said solvent and substantially less soluble at a lower temperature, passing said third and fourth solutions on opposite sides of a membrane permeable to the solvent and impermeable to noncommon ions of said third and fourth solutions at a temperature of high solubility of the third solute in the solvent, passing the solvent from said third solution through the membrane to said fourth solution to form a fifth solution, reducing the temperature of said fifth solution to precipitate said third solute and separating said precipitated third solute to provide a purer solution, and said third solute is further separated from said fifth solution by forcing said solvent through a membrane while retaining said third solute in said fifth solution.

12. A process as set forth in claim 11 wherein said third solute is further separated from said fifth solution by forcing said solvent through a membrane while retaining said third solute in said fifth solution.

13. A process as set forth in claim 11 wherein said step of replacing said third solute is performed by passing said separated fifth solution through an ion exchange medium with said first solute replacing said third solute to form a purer solvent with said first solute.

14. A process as set forth in claim 11 wherein said first solute replaces said third solute by electrodialysis to form a purer solvent with said fist soluble.

15. A process as set forth in claim 11 wherein the step of forming said fourth solution comprises mixing said fifth solution and said separated third solute.

16. A process for providing a purer solution from a first solution having a solvent and solute comprising providing a second solution of greater osmolality than said first solution formed of the solvent with a second solute dissociating into at least two particles on dissolution and being highly soluble at given temperatures in said solvent and substantially less soluble at a lower temperature, passing said first and second solutions at a temperature of high solubility of the second solute in the solvent on opposite sides of a membrane permeable to the solvent; passing the solvent from said first solution through the membrane to said second solution to form a third solution; reducing the temperature of said third solution to precipitate said second solute in a solid combined state and separating said precipitated second solute in a solid combined state to provide a purer solution, and said second solute in a solid combined state is further separated from said third solution by forcing said solvent through a membrane while retaing said second solute in a solid combined state.

* * * * *